United States Patent
Palazzo

[19]

[11] Patent Number: 6,024,243

[45] Date of Patent: Feb. 15, 2000

[54] DOUBLE WALL STORAGE TANK HAVING AN OUTER JACKET WHICH IS SEALED AROUND AN APERTURE AND A METHOD FOR MAKING SAME

[76] Inventor: David T. Palazzo, P.O. Box 290676, Tampa, Fla. 33687

[21] Appl. No.: 09/144,206

[22] Filed: Sep. 1, 1998

Related U.S. Application Data

[63] Continuation-in-part of application No. 08/795,604, Feb. 5, 1997, which is a continuation-in-part of application No. 08/735,610, Oct. 23, 1996, Pat. No. 5,816,435.

[51] Int. Cl.⁷ .................................................. B65D 25/00
[52] U.S. Cl. ....................................... 220/586; 220/567.1
[58] Field of Search ................................ 220/586, 567.1, 220/567.2, 587, 592, 643

[56] References Cited

U.S. PATENT DOCUMENTS

| | | | |
|---|---|---|---|
| 4,625,892 | 12/1986 | Carlin, Jr. | 220/62.22 |
| 4,685,585 | 8/1987 | Robbins | 220/256 |
| 4,780,947 | 11/1988 | Palazzo | 29/455.1 |
| 4,912,966 | 4/1990 | Sharp | 220/567.1 |
| 4,927,050 | 5/1990 | Palazzo | 220/445 |
| 4,958,957 | 9/1990 | Berg et al. | 220/567.1 |
| 5,056,680 | 10/1991 | Sharp | 220/567.1 |
| 5,135,133 | 8/1992 | Frost | 220/601 |
| 5,397,020 | 3/1995 | Witt | 220/402 |
| 5,494,183 | 2/1996 | Sharp | 220/469 |
| 5,505,327 | 4/1996 | Witt | 220/404 |
| 5,590,803 | 1/1997 | Kaempen | 220/567.1 |
| 5,915,586 | 6/1999 | Palazzo | 220/586 |

*Primary Examiner*—Paul T. Sewell
*Assistant Examiner*—Troy Arnold, III
*Attorney, Agent, or Firm*—Carlton, Fields et al.

[57] ABSTRACT

A double wall tank for the storage of liquids is disclosed, comprising a rigid inner tank having an aperture formed through a sidewall of the inner tank, and an outer sheath of synthetic resin material having an opening generally overlying the inner tank aperture and a generally annular flange member attached to the inner tank and extending over a portion of the outer sheath adjacent to and surrounding the outer sheath opening to urge that outer sheath portion toward the inner tank sidewall to form a substantially liquid impervious seal between the outer sheath and the inner tank surrounding and proximal to the inner tank aperture. A generally cylindrical passage member is attached to the inner tank adjacent the aperture and extending through the annular flange member to provide a substantially liquid-tight passage into the inner tank through the aperture and the opening in the outer end of the cylindrical passage member.

19 Claims, 5 Drawing Sheets

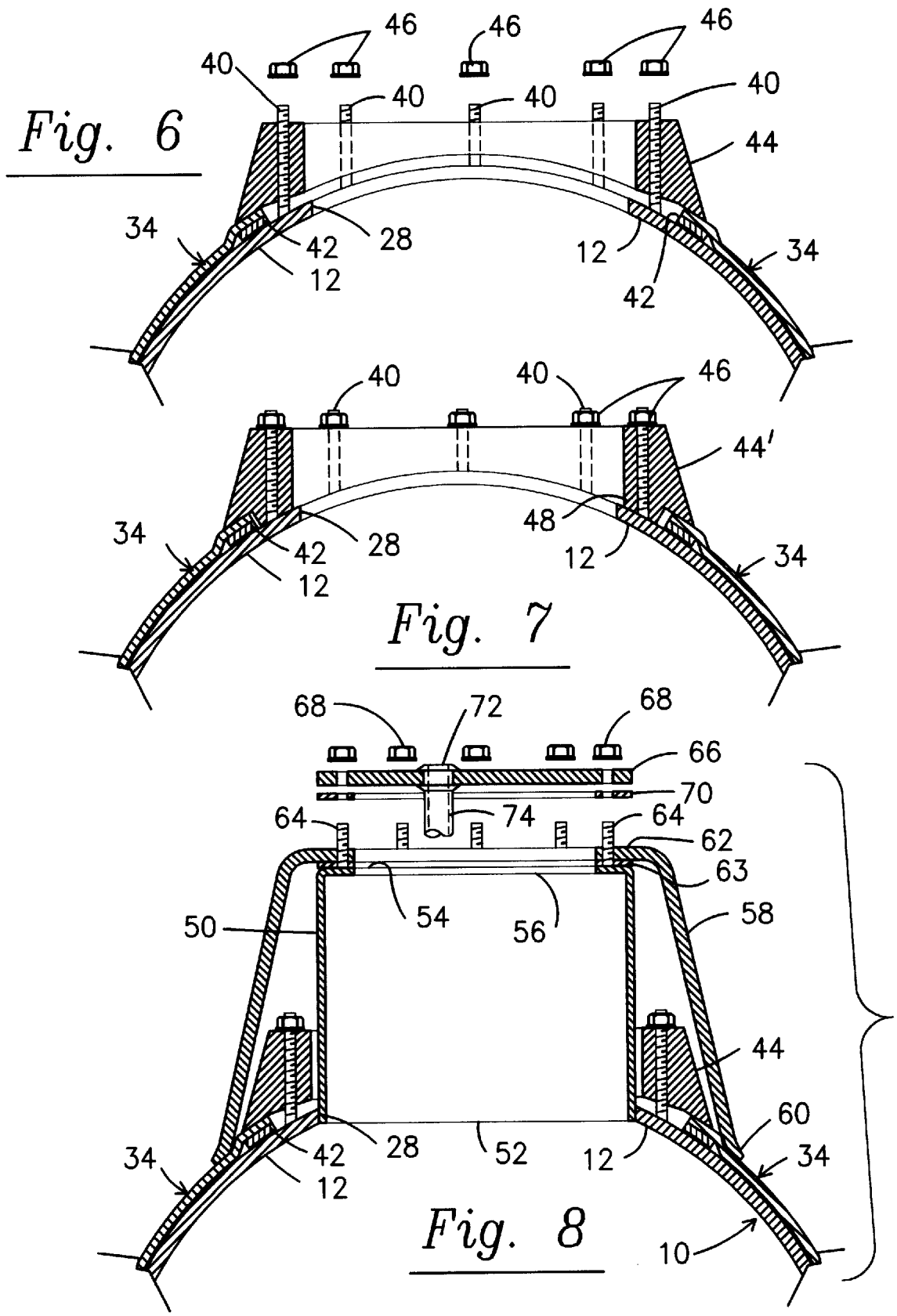

DOUBLE WALL STORAGE TANK HAVING AN OUTER JACKET WHICH IS SEALED AROUND AN APERTURE AND A METHOD FOR MAKING SAME

RELATED APPLICATIONS

This is a continuation-in-part of U.S. patent application Ser. No. 08/795,604, entitled A DOUBLE WALL STORAGE TANK HAVING AN OUTER JACKET BONDED AROUND AN APERTURE AND A METHOD OF MAKING SAME, which was filed Feb. 5, 1997 and now which is a continuation-in-part of U.S. patent application Ser. No. 08/735,610, entitled A DOUBLE WALL STORAGE TANK HAVING AN EXTRUDED OUTER SHEATH AND A METHOD FOR MAKING SAME, which was filed Oct. 23, 1996, and now U.S. Pat. No. 5,816,435.

FIELD OF THE INVENTION

This invention relates to tanks for the storage of liquids, and more particularly to multiple wall tanks for the storage of liquids. Even more specifically, the invention relates to a double wall storage tank having an outer sheath of a synthetic resin material sealed around an inner tank aperture and a method for making same.

BACKGROUND OF THE INVENTION

Tanks for the storage of liquids have been constructed in a variety of ways from a variety of materials. In one common application, the storage of hydrocarbons, such as gasoline and other petroleum products, the tanks have conventionally been fabricated out of steel or fiberglass, most commonly with a single rigid wall. In many applications, this construction has proved reasonably satisfactory, with such tanks functioning properly for many years before requiring repair or replacement. However, the increasing age of many of the tanks currently in place is beginning to present serious environmental dangers. Many of the older steel tanks buried underground have rusted and are beginning to leak, thus releasing the petroleum materials into the ground where they may seep into and pollute underground water supplies. While rust-proof, some fiberglass tanks have also exhibited leakage, causing similar problems.

One of the primary problems with leaking storage tanks has been the difficulty or inability to ascertain when or if such leaks are occurring from a given tank. Because the excavation and removal of such a storage tank, which may contain thousands of gallons of fuel, is an expensive and difficult undertaking, such an operation is difficult to justify unless there is some evidence of actual leakage.

Because of the increasing potential danger of leaking storage tanks, particularly in communities that utilize ground water for public consumption, many municipalities have implemented or plan to implement ordinances requiring the use of double wall storage tanks underground and requiring replacement of existing single wall tanks. While the installation of a conventional double wall tank in a new facility entails no great difficulty and a generally manageable increase in cost over a single wall tank, a heavy burden exists for complying with such ordinances by replacing existing sound, single wall tanks with double wall tanks. This burden has prompted the search for methods of fabricating relatively inexpensive double wall or multi-wall tanks. This burden has also given impetus to the search for a method of remanufacturing existing single wall tanks into double or multi-wall assemblies with means for detecting the presence of any leaks into the space between the walls.

Several methods for manufacturing double wall tank assemblies have been developed, including that disclosed by David T. Palazzo, the inventor of the present invention, in U.S. Pat. No. 4,640,439 and its progeny. That patent generally discloses applying a spacing material over a rigid inner tank and bonding resin impregnated glass fiber mats to the exterior surface of spacing material to form a double wall tank. While conventional glass fiber provides a relatively effective and inexpensive outer sheath, other materials, such as polyolefins, exist that may provide a convenient alternative to forming a substantially liquid impervious outer shell around the rigid inner tank.

A thermoplastic synthetic resin material, such as polyethylene, has been extruded onto the surfaces of steel pipes as disclosed in U.S. Pat. No. 4,478,200 to Hakert, et al., and U.S. Pat. No. 3,616,006 to Landgraf, et al. However, these materials ordinarily will not bond adequately to metallic or steel surfaces, with or without adhesives, as is taught by these and other references. When fabricating a multiple wall storage tank, it is often desired, if not essential, to seal an outer jacket to the inner tank, which is typically formed of steel, around the fittings or apertures that may be formed through many conventional single wall tanks, in order to prevent leakage around these fittings and apertures.

SUMMARY OF THE INVENTION

In view of the foregoing, it is an object of the present invention to provide an economical method of manufacturing a multiple wall storage tank from a generally rigid, single wall tank. It is a further object of the invention to provide a method for manufacturing a multiple wall storage tank having a generally rigid, liquid-impervious outer sheath sealingly secured around fittings or apertures, which may be formed through the conventional inner tank. Still another object of the present invention is to provide an efficient and relatively simple method of manufacturing such a multiple wall storage tank from a rigid, single wall tank.

To achieve these and other objects that will become readily apparent to those skilled in the art, this invention provides a double wall tank intended for the storage of liquids. The tank of the present invention comprises a generally rigid cylindrical inner tank having a closed first end, a closed second end, and a generally cylindrical sidewall portion extending between the first and second ends, the inner tank having an outer surface, and an aperture formed through a preselected area of the inner tank sidewall portion. The double wall tank also includes an outer sheath of a synthetic resin material having a sidewall portion enclosing the inner tank, with an opening formed in the outer sheath sidewall portion generally overlying that inner tank aperture and at least a substantial portion of the outer sheath sidewall portion being detached and spaced from the inner tank sidewall portion to provide for substantially free flow of liquids between at least a substantial portion of the inner tank and the outer sheath. The tank also includes a plurality of spaced-apart attachment members connected to and extending outwardly from the inner tank, the attachment members positioned proximal to and spaced about the inner tank aperture. This tank also includes a generally annular flange member mounted to the attachment members and extending over a portion of the outer sheath adjacent to and surrounding the outer sheath opening, such that the flange member urges the outer sheath portion toward the inner tank sidewall portion to form a substantially liquid-impervious seal between the outer sheath and the inner tank surrounding and proximal that aperture, this flange member including a generally central opening having a predetermined diameter.

Also included is a generally cylindrical passage member having an inner end and an outer end and a diameter smaller than the flange opening diameter, the portion of the cylindrical passage member proximal the inner end being sealingly attached to the inner tank adjacent to and surrounding the aperture for providing a substantially liquid-tight passage into the inner tank through the aperture and the opening.

The present invention also is directed to a method for forming a double wall tank for the storage of liquids. The method comprises the steps for providing a generally rigid tank as set forth above and applying an outer sheath of the synthetic resin material over the inner tank sidewall portion, forming an opening in the outer sheath adjacent to and surrounding the inner tank aperture, with the opening being generally coaxial with the inner tank aperture, clamping the outer sheath to the inner tank at a position proximal to and surrounding the outer sheath opening to form a substantially liquid-impervious seal between the inner tank and the outer sheath portion surrounding the opening, such that at least a substantial portion of the inner tank aperture is exposed through the outer sheath opening, and attaching a generally cylindrical member to the inner tank generally adjacent to and surrounding the inner tank aperture to provide a passage into the inner tank.

BRIEF DESCRIPTION OF THE DRAWINGS

Particularly preferred embodiments of the method of the present invention will be described in detail below in connection with the following drawings in which:

FIG. 6 is a fragmentary sectional view similar to FIG. 5, illustrating installation of an annular flange member;

FIG. 7 is a fragmentary sectional similar to FIG. 6, illustrating an alternative embodiment of the flange member;

FIG. 8 is a side elevation, partially in section, of an alternative preferred embodiment of the tank of FIG. 6, illustrating installation of a cylindrical passage structure within the inner tank aperture and the inclusion of an additional containment structure extending over the passage structure;

DETAILED DESCRIPTION OF PREFERRED EMBODIMENTS

Figure 1:
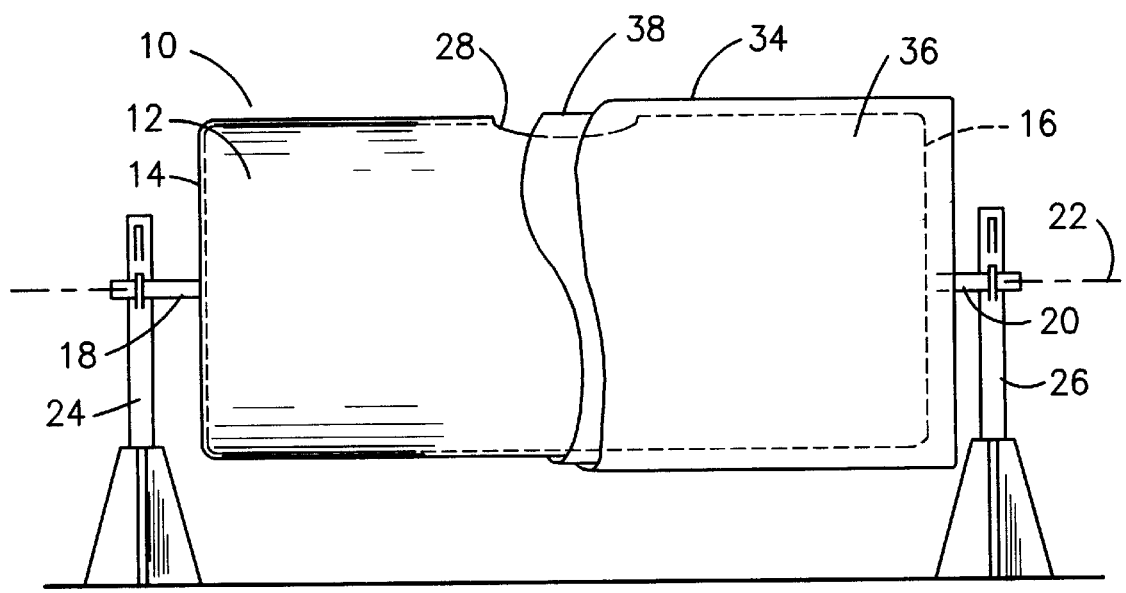
FIG. 1 is a side elevation, partially in section, of a tank according to the present invention, illustrating various steps in the fabrication process.
Figure 2:
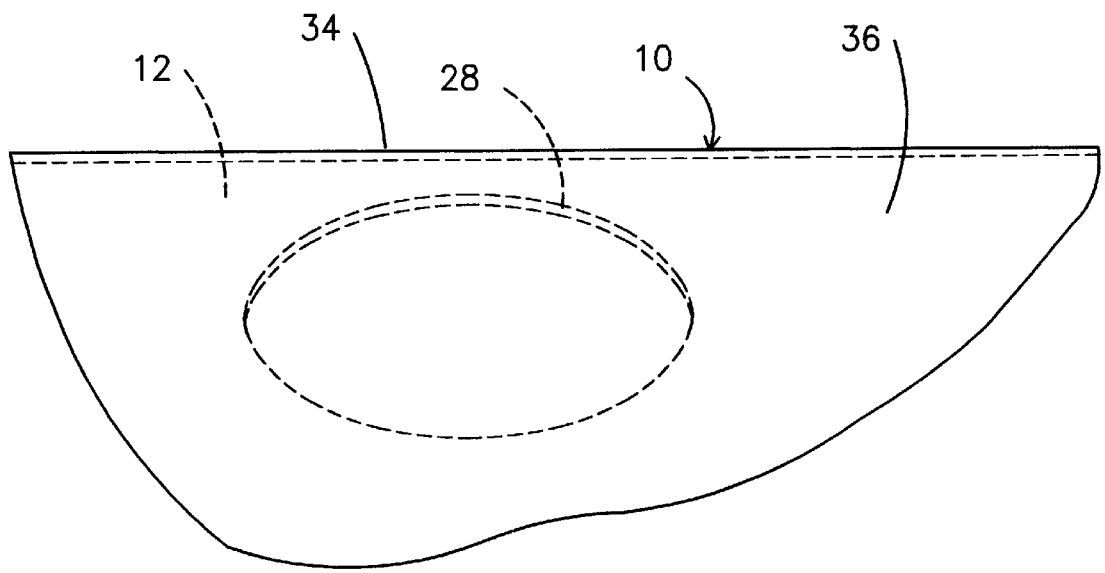
FIG. 2 is a fragmentary upper perspective view of the tank of FIG. 1, illustrating the layer of outer sheath material overlying the aperture.

Preferred embodiments of the apparatus of the present invention are illustrated in FIGS. 1–10, in which similar reference numbers refer to corresponding elements in the various views. FIG. 1 illustrates a tank fabricated according to one preferred method of the present invention, in which is provided a rigid inner tank, generally indicated as 10, having generally cylindrical sidewall portions 12, and closed end portions 14 and 16, which are generally transverse to the sidewall portions 12. Elongated spindle members 18 and 20 preferably may be attached to and extend outwardly of each of the end portions 14 and 16, respectfully, generally coaxially with the central axis of the inner tank 10, illustrated as reference number 22. As illustrated in FIG. 1, the spindle members 18 and 20 may be supported by fixed supports 24 and 26 upon which the inner tank 10 may conveniently be rotated about its axis 22, such as by a motor or any conventional rotation means, to facilitate the fabrication of the multiple wall storage tank. Alternatively, instead of having spindle members 18 and 20 attached to the end portions 14 and 16 of the inner tank 10, two or more straps, such as continuous belts, may be positioned around a portion of the tank sidewall portions 12. The straps would then be suspended from and simultaneously advanced around a plurality of overhead pulleys in a conventional manner in order to rotate the tank 10 generally about its longitudinal axis 22. Still another approach would be to position inner tank 10 on a series of rollers to rotate inner tank 10 generally about its axis 22.

While various forms and shapes of tanks may be utilized in practicing this invention, the most common shape utilized for such storage tanks is that of a cylinder, generally a right circular cylinder, having closed end portions 14 and 16. For simplicity of illustration this configuration of tank is utilized for illustrating a preferred embodiment of this invention. Also, while virtually any construction of rigid inner tank 10, whether metal or fiberglass or other materials, may be utilized in practicing this invention, one preferred and readily available type of structure is a tank formed of welded steel, preferably having an appropriate corrosion resistant coating on its surfaces. Although the inner tank may have a corrosion resistant coating, it is not strictly necessary, because a later-applied outer sheath acts as a corrosion resistant barrier. For purposes of illustration such a steel tank 10 will be described. It is also to be understood that the tank 10 may be a newly fabricated tank, which may or may not have a manway opening or fittings cut in it, or it may be a previously used tank removed from its prior installation and cleaned for remanufacturing in accordance with this invention.

While the present invention will be described as a series of steps, it will be understood and appreciated by those of ordinary skill in the art that the order of various steps may be modified without departing from the spirit and scope of this invention, unless otherwise indicated. Accordingly, a rigid inner tank 10 is provided that has at least one aperture, suitably a manway, indicated by reference number 28 on FIGS. 1 and 2, or a plurality of apertures, including manway 28, and other fittings (not shown) formed through the sidewall portions 12. During the fabrication process, it may be desirable to cover or close such apertures, as by welding an appropriately configured sheet of steel generally flush with the inner tank exterior surface 17. It will become apparent that the method of the present invention may be applied to a new tank that does not include such apertures, and that appropriate such apertures may be formed through the tank late in the fabrication process. In order to simplify this description, however, the preferred embodiment described herein will assume that the inner tank 10 includes at least one such aperture.

To fabricate the double wall tank used in this invention, any of a variety of manufacturing processes may be used. Examples of suitable processes are those disclosed in my prior patents, U.S. Pat. No. 4,640,439, U.S. Pat. No. 4,644, 627, U.S. Pat. No. 4,744,137, U.S. Pat. No. 4,780,946 and U.S. Pat. No. 4,780,947, and in my co-pending application Ser. No. 08/735,610, all of which are incorporated by reference, among numerous others.

Figure 3:
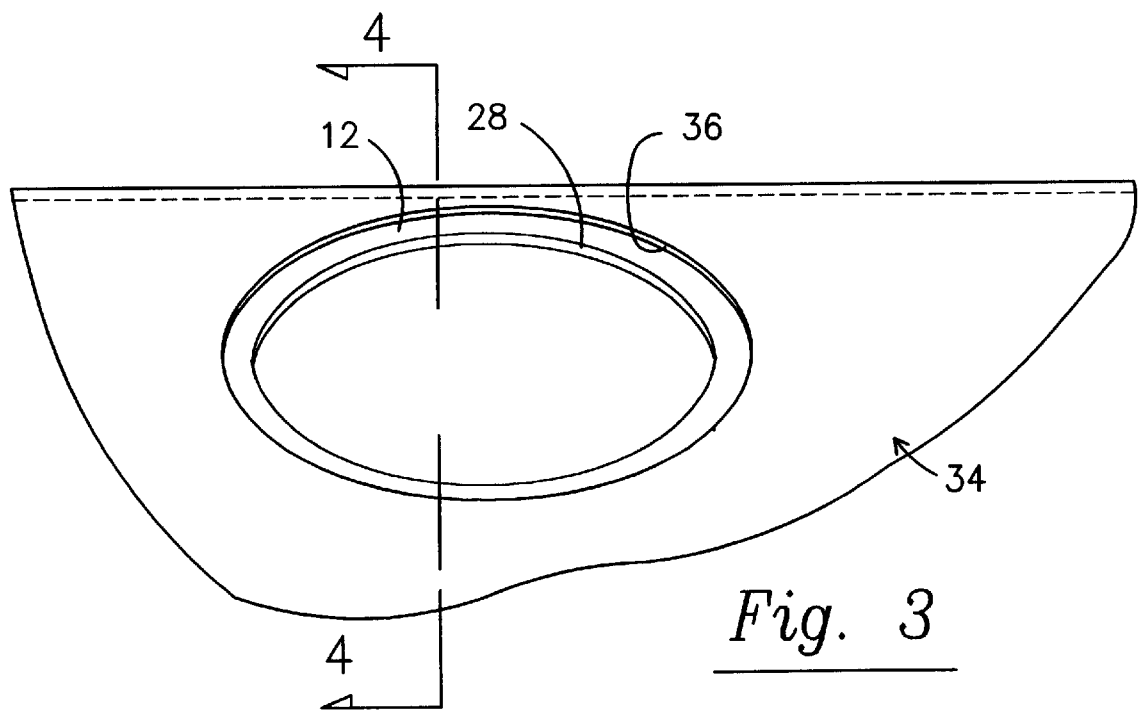
FIG. 3 is a fragmentary upper perspective view similar to FIG. 2, but illustrating the removal of portions of the outer sheath material surrounding the aperture.
Figure 4:
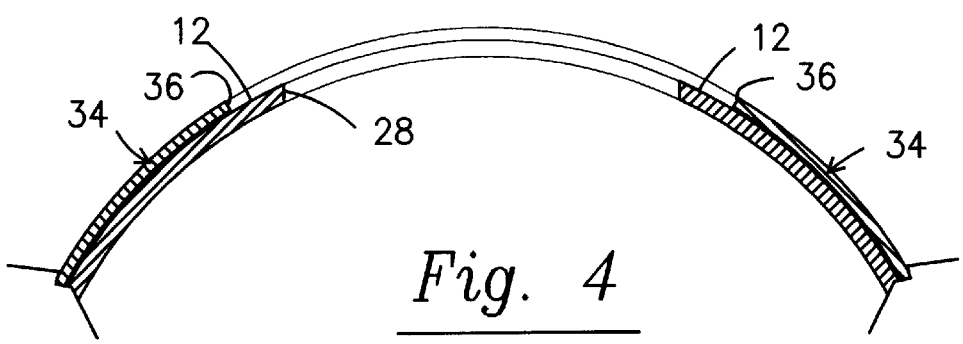
FIG. 4 is a fragmentary sectional view taken along line 4—4 of the tank of FIG. 3, illustrating the various layers of material applied in the fabrication process.
Figure 5:
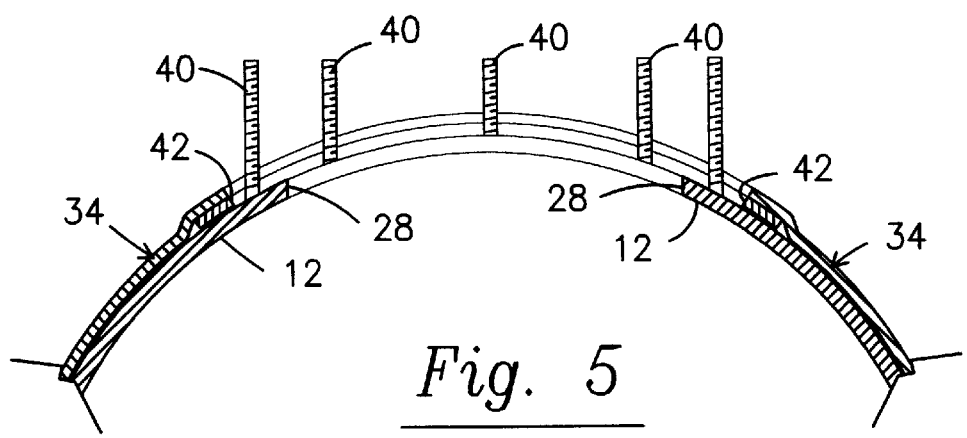
FIG. 5 is a fragmentary sectional view similar to FIG. 4, illustrating the installation of the flange attachment members and of a resilient member surrounding the aperture.
Figure 9:
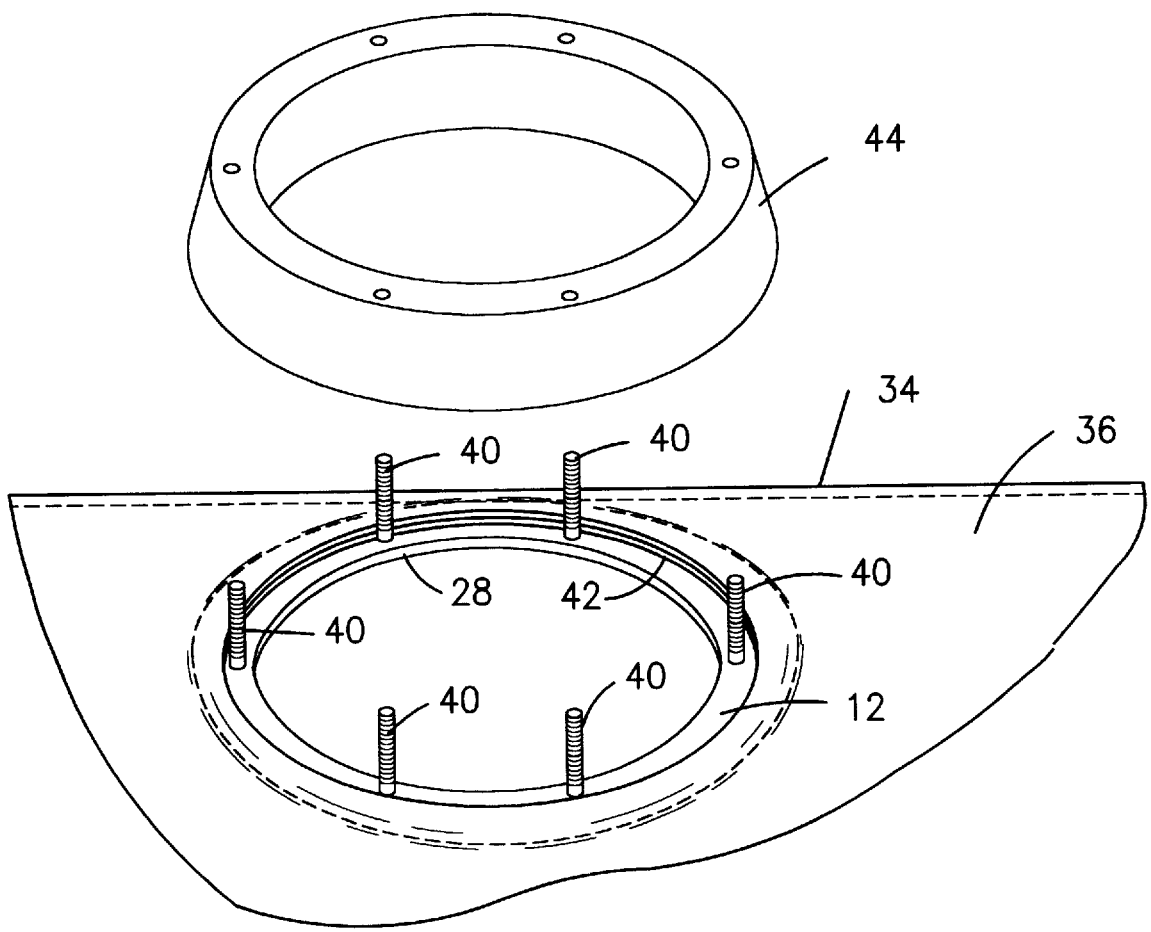
FIG. 9 is an upper perspective view of the tank of FIG. 9 with a portion of the outer sheath removed and a flange member positioned for installation on the attachment members.

As disclosed in those prior patents and application, an outer sheath 34 of a suitable synthetic resin is formed over the outside of the tank 12. At least a substantial portion of the cylindrical sidewall portion 36 of this outer sheath 34 is detached and spaced apart from the inner tank sidewall 12 to provide for substantially fee flow of liquids between at least a substantial portion of that inner tank and the outer sheath. In one preferred embodiment this spacing may be accomplished by interposing a suitable spacing material 38, of any suitable type, and conveniently of the nature of the spacing materials disclosed in those prior patents noted above. As shown in FIG. 3, the outer sheath 36 may be formed covering aperture 28 and any other apertures or fittings. Then, as shown in FIG. 3, the aperture and fittings may be exposed, suitably by removing through cutting or other conventional means the portion of the outer sheath 36 overlying each of those aperture and fittings. Suitably, the outer sheath 36 may be cut back from the edges of the aperture 28 and any other fittings to expose the portion of the inner tank sidewall surrounding the aperture, as shown in FIG. 3. FIG. 4 illustrates a fragmentary section view taken along lines 4—4 of FIG. 3, further illustrating the preferred cutback arrangement of the outer sheath. As shown in FIGS. 5–9 a plurality of attachment members 40, conveniently in the form of threaded studs, are connected to and extend outwardly from the inner tank, the attachment members being positioned proximal to and spaced about that inner tank aperture 28.

Also as illustrated in FIGS. 5–9, resilient material, preferably of a liquid impervious material, such as polyethylene or silicone rubber or other comparable material, is applied to the inner tank surrounding and proximal the aperture 28. Preferably, this resilient material 42 is in the form of a generally flat annular ring, forming a gasket positioned between the inner tank 12 and the outer sheath 34. If desired, this resilient material 42 may be positioned around the aperture prior to the application of the outer sheath 34. Alternatively, the portion of the outer sheath 34 surrounding the aperture 28 may be forced away from the inner tank 12 so that this resilient material 42, such as the ring or flat annular member shown in FIG. 9, may be inserted under the portions of the outer sheath 34 surrounding the aperture 28. As shown in FIGS. 5–9, a plurality of spaced apart attachment members 40, suitably in the form of threaded studs, are connected to and extend outwardly from the inner tank 12 adjacent and surrounding the aperture 28. As seen most clearly in FIGS. 6–9, a substantially rigid, generally annular member 44, which may be fabricated of steel or other rigid material, is mounted by the attachment members 40 to the tank, overlying both the portion of the inner tank sidewall 12 surrounding the aperture 28 and also the portion of the outer sheath 34 surrounding and adjacent that aperture 28. In this embodiment the annular member 44 is received onto the studs comprising the attachment members 40, with fastening elements, such as nuts 46, then being threaded onto the outer ends of the attachment members 40 and tightened to urge the annular member 44 firmly into engagement with the underlying portion of the outer sheath 34. This serves to clamp that outer sheath 34 firmly against the resilient element 42 and then the tank sidewall 12, thus sealing the outer sheath 34 against any leakage to the outside environment in the area surrounding the cutaway portion of that outer sheath 34 surrounding the aperture 28. It may be noted that portions of the annular member 44 facing the tank and outer sheath preferably are configured generally to conform to the shape of that portion of the tank and outer sheath.

FIG. 7 represents a slightly different configuration of the annular member 44', in which a shoulder portion 48 is provided to engage the outer surface of the inner tank sidewall 12 around the aperture 28. This structure may serve to reduce the possibility of crushing the portion of the outer sheath 34 that it engages and urges into sealing relationship with the resilient member 42 and then the inner tank sidewall 12.

While the attachment members are shown in FIGS. 5–9 as being threaded studs affixed, conveniently by welding or other conventional means, to the outer surface of the inner tank 10 and then extending outwardly to receive the annular flange member 44, it is to be understood that numerous other types of attachment members may be used with equal facility. Such other types of attachment members 40 could include, without limitation, unthreaded studs that receive other types of fasteners besides the nuts 46, onto the outer ends to hold the flange member 44 in position. Similarly, the attachment members could include nuts or threaded sockets affixed to the inner tank into which are received threaded bolts extending down through the flange member 44. These and other forms of attachment are conventional, and numerous other variations, all within the scope of this patent, will readily occur to those skilled in the art.

It is frequently desirable to provide selectively closable structure for access from the outside of the tank into the interior of the tank. As shown in FIG. 8, one convenient configuration includes a generally cylindrical passage member 50, serving as a manway and having an inner end 52 and an outer end 54, which cylindrical passage member 50 may conveniently be of a diameter smaller than the diameter of the opening in the center of the annular member 44, as shown in FIG. 8, or may be of a diameter larger than the aperture and be affixed to the outside of tank sidewall 12. This cylindrical passage member 50 may be fabricated of steel or other suitable material and conveniently may be affixed within the aperture 28 by conventional means, such as welding, to sealingly attach the passage member 50, proximal its inner end 52, to the tank sidewall 12 adjacent and generally filling the aperture 24 to provide a substantially liquid-tight passage into the inner tank through the cylindrical passage member.

If desired, secondary containment, further sealing the opening in the outer sheath 34 surrounding the aperture 28, may be provided in connection with the cylindrical passage member 50, as shown in FIG. 8. Suitably, an additional structure 58, formed of either metal or a suitable synthetic resin, is fabricated, extending from the aperture 56 in the outer end of cylindrical member 50, to a portion of the outer sheath 34 radially outward from the opening in that outer sheath that is adjacent the aperture 28. The portion 60 of that structure 58 that engages the outer sheath 34 may suitably be sealed to that outer sheath 34 with an appropriate adhesive or, if both the outer sheath and the structure 58 are fabricated of a thermoplastic material, by a suitable thermoplastic weldment or other conventional means. The outer end portion 62 of that structure 58 is preferably attached to the outer end 54 of the cylindrical passage member 50 by conventional means, which may conveniently be of a form similar to the clamping arrangement for securing the annular member 44 against the tank outer sheath. Specifically, studs 64 may be affixed to the outer end 54 of the passage member 50 and extend through the outer end 62 of the structure 58, as shown in FIG. 8. If desired, an additional sealing member, such as gasket 63, may be provided between structure and position 62 and passage member outer end 54.

To provide for selective closing of the outer end of the cylindrical passageway 50 and of the secondary containment structure 58 there may conveniently be provided a member, such as plate 66, that may suitably be received onto the attachment members 64 for clamping engagement over the aperture 56 under the urging of additional attachment elements, such as nuts 68 that may be received onto attachment members 64. Preferably, a resilient sealing member, such as gasket 68, may be interposed between the member 66 and the outer end 62 of the secondary containment structure, as is indicated in the exploded view of FIG. 8. With this structure the cover plate member 66 may be removed for access to the interior of the tank without breaking the liquid impervious seal between the outer sheath 34 and the inner tank 10.

To provide for communication with the interior of the tank 10 when the aperture and cylindrical member is closed by the cover plate 66, there may be provided a fitting 72. Suitably, this fitting 72 may be formed with or attached to the cover plate 66, and may have conventional internal threads to receive a conventional externally threaded conduit 74 for communication into the interior of the tank. Such a conduit may conveniently be used either for withdrawal of liquid from the interior of the tank, or for measurement of the quantity of liquid remaining in the tank, or for other suitable purposes.

Figure 10:
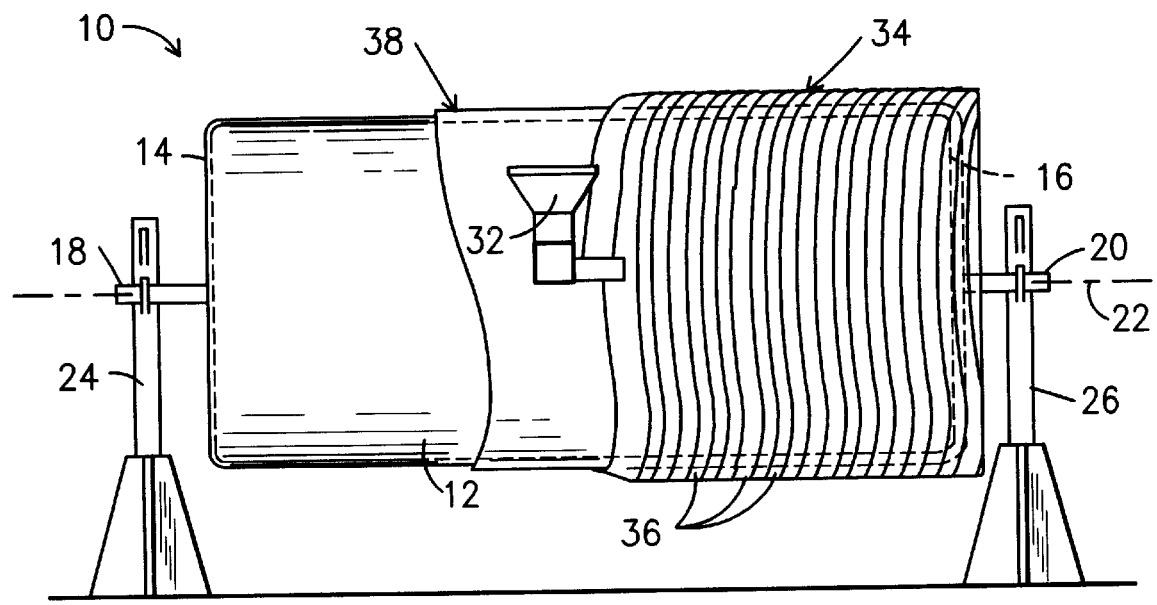
FIG. 10 is a side elevation, partially in section, of a tank according to the present invention, illustrating various steps of an alternative fabrication process.

FIG. 10 illustrates an alternative preferred method of forming the outer sheath on the tank of this invention. This process involves the helical application onto a tank 10 of one or more overlapping strips of a polymer directly extruded onto the tank. This process is described in detail in my copending application Ser. No. 08/735,610, the disclosure of which is incorporated by reference herein. Subsequent to the application of the outer sheath 34 by this process, the remaining steps in forming the tank of this invention by this process are substantially the same as those described with respect to FIGS. 1–9 above and are not repeated here.

While the foregoing describes several preferred embodiments of the double wall storage tank of this invention and the method of making it, it is to be understood that these descriptions are to be considered only as illustrative of the principles of this invention and are not to be considered limitative thereof. Because numerous other variations and modifications of this process and the resulting tank, all within the scope of this invention, will readily occur to those skilled in the art, the scope of this invention is to be limited solely by the claims appended hereto.

What is claimed is:

1. A double wall tank for the storage of liquids comprising:

a rigid cylindrical inner tank having a closed first end, a closed second end, and a generally cylindrical sidewall portion extending between said first and second ends, said inner tank having an outer surface and an aperture formed through a preselected area of said inner tank sidewall portions;

an outer sheath of a synthetic resin material having a sidewall portion enclosing said inner tank, with an opening formed in said outer sheath sidewall portion generally overlying said inner tank aperture, at least a substantial portion of said outer sheath sidewall portion being detached and spaced apart from said inner tank sidewall portion to provide for substantially free flow of liquids between at least a substantial portion of said inner tank and said outer sheath;

a plurality of spaced apart attachment members connected to and extending outwardly from said inner tank, said attachment members positioned proximal to and spaced about said inner tank aperture;

a generally annular flange member mounted to said attachment members and extending over a portion of said outer sheath adjacent to and surrounding said outer sheath opening, such that said flange member urges said outer sheath portion toward said inner tank sidewall portion to form a substantially liquid impervious seal between said outer sheath and said inner tank surrounding and proximal to said aperture, said flange member having a generally central opening having a predetermined diameter; and a generally cylindrical passage member having an inner end and an outer end and a diameter smaller than said annular member opening diameter, the portion of said cylindrical passage member proximal said inner end being sealingly attached to said inner tank adjacent to said aperture for providing a substantially liquid-tight passage into said inner tank through said aperture and said opening.

2. A tank according to claim 1 wherein said cylindrical passage member further comprises a cover plate removably and sealingly attached to said outer end thereof.

3. A tank according to claim 1 wherein said cylindrical passage member comprises a fitting having a threaded inner surface.

4. A tank according to claim 3 further comprising a conduit having a threaded outer surface threadedly attached to said fitting threaded inner surface.

5. A tank according to claim 1 wherein said attachment members are secured to said outer surface of said inner tank sidewall portions.

6. A tank according to claim 1 wherein said flange member is configures to engage both said inner tank sidewall and said outer sheath proximal said inner tank aperture, and is configured to receive said attachment members for attachment of said flange to said tank.

7. A tank according to claim 1 wherein said flange member is configured to engage only said attachment members and the portion of said outer sheath surrounding said inner tank aperture.

8. A tank according to claim 1 further comprising a generally flat annular member of a resilient material positioned between said outer sheath and said inner tank and positioned surrounding and proximal to said aperture.

9. A tank according to claim 1 further comprising a gasket positioned between said outer sheath and said inner tank and positioned surrounding and proximal to said aperture, said gasket being generally axially aligned with said flange member.

10. A tank according to claim 1 further comprising a housing structure extending from said outer sheath to a location proximal said outer end of said cylindrical passage member and substantially surrounding said cylindrical passage member.

11. A double wall tank intended for the storage of liquids comprising:

a generally rigid cylindrical inner tank having a closed first end, a closed second end, and a generally cylindrical sidewall portion extending between said first and second ends, said inner tank having an outer surface, a longitudinal axis extending through said first and second ends and an aperture formed through said inner tank sidewall portion, said inner tank aperture having a periphery and a central axis extending therethrough generally normal to said inner tank sidewall portion;

an outer sheath of a synthetic resin material surrounding said inner tank sidewall portion, said outer sheath having a sidewall portion detached from at least a substantial portion of said inner tank sidewall portion to provide for substantially free flow of liquids between at least a substantial portion of said inner tank and said outer sheath, and said outer sheath having an opening formed through said outer sheath sidewall portion substantially coaxial with and surrounding said inner tank aperture;

a clamping structure having a generally annular flange member positioned adjacent to and surrounding said outer sheath opening, said flange member being attached to said inner tank and urging a portion of said outer sheath towards said inner tank to form a substantially liquid-impervious seal between said outer sheath and said inner tank surrounding and proximal to said inner tank aperture; and a generally cylindrical member attached to said inner tank adjacent to and generally coaxially with said inner tank aperture for providing access to said inner tank through said inner tank aperture and said outer sheath opening.

12. A tank according to claim 11 wherein said generally cylindrical member further comprises a removable cover plate attached thereto, such that said cover plate may be removed without breaking said liquid-impervious seal between said outer sheath and said inner tank.

13. A tank according to claim 11 wherein said clamping structure further comprises:

a plurality of spaced apart attachment members of rigid material connected to and extending outwardly from said inner tank adjacent to and surrounding said aperture; and a generally annular flange member connected to said plurality of attachment members, said flange member having a first end that engages said outer sheath at a position substantially adjacent to said outer sheath opening, thereby urging said outer sheath towards said inner tank to form said substantially liquid-impervious seal.

14. A tank according to claim 11 wherein said generally cylindrical member further includes a fitting having a threaded inner surface for receiving a correspondingly externally threaded conduit through which liquids may be introduced or withdrawn.

15. A tank according to claim 11 wherein said tank further comprises a resilient member positioned between said outer sheath and said inner tank surrounding and proximal to said inner tank aperture.

16. A tank according to claim 11 wherein said outer sheath opening is generally concentric with and larger than said inner tank aperture.

17. A method for forming a double wall tank for the storage of liquids comprising the steps of:

providing a generally rigid inner tank having closed end portions, a generally cylindrical sidewall portion extending between said closed end portions, said inner tank having an outer surface and an aperture formed through said inner tank sidewall portion, said inner tank aperture having a central axis extending normal to said inner tank sidewall portion;

applying an outer sheath of synthetic resin material over said inner tank sidewall portion;

forming an opening through said outer sheath in the portion of said outer sheath adjacent to and surrounding said inner tank aperture, said opening being generally coaxial with said inner tank aperture;

clamping said outer sheath to said inner tank at a position proximal to and surrounding said outer sheath opening to form a substantially liquid-impervious seal between said inner tank and said outer sheath portion surrounding said opening such that at least a substantial portion of said inner tank aperture is exposed through said outer sheath opening; and attaching a generally cylindrical member to said inner tank generally adjacent to and surrounding said inner tank aperture to provide a passage into said inner tank.

18. A method according to claim 17 further comprising applying a resilient material to said inner tank surrounding and proximal to said inner tank aperture prior to said clamping step; and as a part of said clamping step, urging said resilient material into sealing engagement with said inner tank and said outer sheath.

19. A method according to claim 17 further comprising the step of:

interposing a resilient, liquid impervious material between said inner tank and said outer sheath adjacent to and surrounding said outer sheath opening prior to said clamping step.

* * * * *